(12) United States Patent
Koitabashi et al.

(10) Patent No.: US 6,494,569 B2
(45) Date of Patent: Dec. 17, 2002

(54) INK-JET PRINTING METHOD

(75) Inventors: Noribumi Koitabashi, Kanagawa; Hitoshi Tsuboi, Tokyo; Yasunori Fujimoto, Kanagawa, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/883,320

(22) Filed: Jun. 19, 2001

(65) Prior Publication Data

US 2002/0044185 A1 Apr. 18, 2002

(30) Foreign Application Priority Data

Jun. 21, 2000 (JP) .................................... 2000-187017

(51) Int. Cl.[7] .................................................. B41J 2/17
(52) U.S. Cl. ......................... 347/98; 347/100; 347/101
(58) Field of Search ................................ 347/101, 100, 347/98, 96, 95

(56) References Cited

U.S. PATENT DOCUMENTS 5,518,534 A    5/1996  Pearlstine et al. ......... 106/20 R
5,938,827 A  * 8/1999  Breton et al. ............ 106/31.58
6,074,052 A    6/2000  Inui et al. ................... 347/101
6,084,619 A  * 7/2000  Takemoto et al. .......... 347/100

FOREIGN PATENT DOCUMENTS

WO    WO 96/18696   *  6/1996   ........... C09D/11/02

* cited by examiner

Primary Examiner—John Barlow
Assistant Examiner—Manish S Shah
(74) Attorney, Agent, or Firm—Fitzpatrick, Cella, Harper & Scinto

(57) ABSTRACT

An ink-jet printing method for obtaining higher quality printed Images by utilizing an ink-jet recording technology using a pigment ink and a treatment liquid. A treatment liquid for unstabilizing the dispersed condition of the pigment in the aqueous medium is applied onto the printing medium, and subsequently either an ink containing a self-dispersion type pigment and a pigment dispersed by a polymeric dispersant or an ink containing a self-dispersion type pigment and an ink containing a pigment dispersed by a polymeric dispersant are applied together to the printing medium in such a way that the treatment liquid and the inks are mixed in a liquid state on the printing medium to make the pigments indissoluble.

27 Claims, 5 Drawing Sheets

INK-JET PRINTING METHOD

BACKGROUND OF THE INVENTION

1. Field of the Invention

This invention relates to an ink-jet printing method and, more particularly, it relates to an ink-jet printing method for printing characters and images on a sheet of printing paper, OHP paper or the like, using an ink containing a coloring material and a liquid for insolubilizing the coloring material contained in the ink (to be referred to as treatment liquid hereinafter).

2. Related Background Art

The ink-jet printing system has various advantages including a low noise emission level, low running cost, the potential for high speed printing and down-sizing, the ease of color printing and so on and hence It is currently widely used in various printers and copying machines. With a printer using an ink-jet printing system, ink is generally selected from the viewpoint of ink ejection performance, printing characteristics including fixability and printing quality including blurring of printed images, optical reflection density and color development properties. Meanwhile, it is well known that there are two types of ink in terms of the coloring material contained therein. They are dye ink and pigment ink.

Pigment ink is advantageous to dye ink from the viewpoint of water-resistance and light-resistance and can print characters clearly to achieve high quality printing. On the other hand, pigment ink takes more time than dye ink for fixation on a printing medium and is not satisfactory in terms of abrasion resistance of the image after fixation if compared with dye ink. Additionally, each ink dot of pigment ink formed on a printing medium by a single ink-ejecting operation of a nozzle is relatively small when compared with that of dye ink. The pigment contained in the pigment ink can be reliably and stably dispersed in the ink by means of the electric repulsion of a polymeric dispersant so as to overcome the intermolecular force which acts between the pigment particles to cause aggregation. Therefore, it is preferable to add a polymeric dispersant to pigment ink depends on the pigment content of pigment ink.

When a sheet of plain paper is printed with pigment ink by means of an ink-jet recording method, the pigment particles contained in the ink aggregate as the solvent of ink, such as water, penetrates into the paper and evaporates into the air. Then, in terms of the behavior of the ink on the sheet of paper, the aggregational force of the ink becomes stronger when the polymeric dispersant is contained in the ink in a higher content. As a result, each ink dot formed on the printing medium by an ink having a predetermined volume ejected from an ink-jet head tends to minimize its diameter and keep a distorted profile produced as a result of the collision of the ink with the surf ace of the sheet of paper. Therefore, in order to obtain ink dots having a recording density necessary for forming an image on the sheet of paper and having a dot diameter necessary for forming an image without generating white stripes, some regulating measures should be taken to have a rather large volume of ink ejected from the ink-jet head. However, even with such regulating measures, the fixation of ink to the printing medium can take a long time and the scratch resistance of the recorded image can be reduced, because of the strong aggregational force of the pigment particles adsorbed by the polymeric dispersant and the resultant poor permeation of ink into the sheet of paper.

The use of a penetrant may be conceivable to improve the ink permeability of the printing medium in order to increase the ink dot diameter and improve the fixation of ink to the printing medium. However, the use of a penetrant can be accompanied by a problem of a degraded ink dot profile (a degraded circumferential profile of each ink dot such as feathering) and that of permeation of ink to the rear surface of the sheet of paper (so-called back-through) that are undesirable for producing high quality recorded images. Additionally, if the ink dot diameter is relatively large, the OD (optical density) of the ink dot may not be raised because the coloring material of the ink can penetrate into the printing medium. Still additionally, there is a problem that a higher printing speed will be required to ink-jet printers in business applications where the demand for ink-jet printers is expected to rise dramatically. If fixation of ink to the recording medium is not enough in a process of successively discharging printed sheets of paper from an ink-jet printer and sequentially laying them one on the other, a second sheet of paper discharged from the ink-jet printer may be laid on the first sheet of paper while the ink on the surface of the first sheet of paper is not fixed enough, so that there may arise a problem that the image on the first sheet of paper becomes blurred and/or the ink on the first sheet of paper sticks to the rear surface of the second sheet of paper.

Meanwhile, an ink containing a self-dispersion type pigment has been proposed. With such ink, the ink dots formed on a sheet of paper give an increased dot diameter probably because the pigment contained in the ink has an aggregational force weaker than that of ordinary ink pigment that is dispersed by a polymeric dispersant, when applied onto the surface of paper. However, the increased dot diameter is still not satisfactory.

As pointed out above, the currently available ink-jet printing methods still have much room for improvement in various aspects relating to the quality of the recorded image that include fixation of ink, enlargement of ink dot diameter, uniformity of density of each ink dot and high optical density of ink dots.

On the other hand, in the field of ink-jet printing technology, methods of applying ink and treatment liquid that reacts with the applied ink have been proposed In order to improve the quality of printed characters and images (e.g., in terms of water resistance and optical density of the image formed on a printing medium) by causing the applied ink and the treatment liquid to favorably react each other on the printing medium. Some of such methods have found practical applications.

SUMMARY OF THE INVENTION

Under the above identified circumstances, the inventors of the present invention have paid intensive research efforts for developing the ink-jet recording technology of using in combination a pigment ink and a treatment liquid that destroys the dispersibility of the pigment ink at the time of recording. In the course of the researches, the inventors experimented a recording process of applying a treatment liquid onto the surface of a printing medium and subsequently applying a pigment ink in such a way that the latter is mixed with the treatment liquid in a liquid state on the printing medium. As a result, it was found that some of the obtained images showed an image quality that is far from satisfactory and is sometimes even worse than the quality of images formed by using only pigment ink. More specifically, in the case of a combination of a pigment ink containing a pigment dispersed in an aqueous medium by means of a polymeric dispersant and a treatment liquid capable of reacting with such ink, the produced ink dots had a low optical density (OD) probably because of a small area factor of the ink dots. Although why such a phenomenon occurred is not clear, the inventors presume that the aggregation of pigment in the ink was greatly accelerated by the treatment liquid on the printing medium.

The area factor may be raised to enhance the OD by increasing the shot-in quantity of the pigment ink. Then, however, the fixation of ink can sometimes be worsened. In the case of a combination of a pigment ink containing a self-dispersion type pigment and a treatment liquid capable of reacting with such pigment ink, the dots formed on the printing medium showed the phenomenon of so-called exudation or haze along the circumferences thereof to blur the profiles of the dots. FIG. 1 of the accompanying drawings schematically illustrates a dot showing such exudation or haze As shown in FIG. 1, the phenomenon of exudation or haze can be observed along the reaction zone of a pigment ink 8 that is located at the center and a surrounding treatment liquid 6. FIGS. 2A through 2C of the accompanying drawings schematically illustrate the presumed mechanism of appearance of the phenomenon.

After a treatment liquid S is applied onto a printing medium P (a sheet of plain paper in particular), a pigment ink Ip containing a self-dispersion type pigment but not containing any polymeric dispersant is applied onto the treatment liquid S. Then, the treatment liquid S and the pigment ink Ip react each other to start producing a reaction product 9 (see FIG. 2B). As the reaction proceeds, exudation of the reaction product appears radially from the circular dot of the ink as shown in FIG. 2C to make the entire dot appear as if it were surrounded by haze. Such exudation or haze is apparently recognized as feathering that is a known phenomenon to consequently degrade the quality of printing.

The Inventors of the present invention assume that such exudation or haze is a phenomenon that can be explained in a manner as described below in chemical or micro-dimensional terms. The pigment ink containing no dispersant reacts with the treatment liquid at a relatively high reaction rate so that some of the dispersed pigment particles are instantaneously subjected to dispersive destruction to produce clusters of the reaction product together with microparticles of the reaction product. Then, the particles of the reaction product start flowing out as the permeation front SP in the printing medium expands, and thereby the exudation or haze appears.

As described above, a situation unpredictable to the inventors of the present occurred when a pigment ink and a treatment liquid were simply combined, so that it was difficult to obtain a high quality image by ink-jet recording. As a result, the inventors recognized that further efforts were required for technological development in order to achieve the initial object of eliminating the drawbacks of pigment ink, while utilizing the ink-jet recording process using a treatment liquid and exploiting the advantages of a pigment ink.

Furthermore, as pointed out above, a higher printing speed will be required to ink-jet printers in business applications where the demand for ink-jet printers is expected to rise dramatically. One of the major problems of high speed printers is the fixation of ink on a recording medium. If fixation of ink to the recording medium is not satisfactory in a process of successively discharging printed sheets of paper from an ink-jet printer and sequentially laying them one on the other, a second sheet of paper discharged from the ink-jet printer may be laid on the first sheet of paper while the ink on the surface of the first sheet of paper is not fixed enough, so that there may arise a problem that the image on the first sheet of paper becomes blurred and/or the ink on the first sheet of paper sticks to the rear surface of the second sheet of paper to consequently damage the appearance of the printed sheets of paper.

Thus, the present invention is based on the technological findings of the inventors of the present invention. It is an object of the present invention to provide an ink-jet printing method to produce higher quality printed images by utilizing the ink-jet recording technology using a pigment ink and a treatment liquid.

Another object of the present invention is to provide an ink-jet printing method which can achieve high speed fixation of ink to the recording medium without sacrificing the quality of the printed image.

In an aspect of the invention, the above objects are achieved by providing an ink-jet printing method to be used for a process of recording an image on a printing medium, comprising:

a first step of applying an ink onto the printing medium by an ink-jet recording method; and a second step of applying a treatment liquid containing at least one of a polyvalent metal ion and a salt thereof;

said first step being conducted subsequent to said second step so as to cause the ink and the treatment liquid to come into contact with each other in a liquid state on the printing medium;

said ink containing a first pigment, a second pigment and a polymeric dispersant for dispersing said second pigment in an aqueous medium, said first pigment and said second pigment being contained in said ink in a dispersed state;

said first pigment being a self-dispersing pigment having at least one anionic group bound to the surface of said first pigment directly or by way of another atomic group, said second pigment being capable of dispersing-in said aqueous medium by means of said polymeric dispersant;

said polymeric dispersant containing at least one of a polymeric dispersant having the same polarity as that of the group bound to the surface of said first pigment and a nonionic polymeric dispersant;

said treatment liquid containing at least one of a polyvalent metal ion and a salt thereof, and destabilizing dispersion stability of at least one of said pigments contained in said ink when the treatment liquid and the ink are applied onto the printing medium so as to come into contact with each other in a liquid state.

In another aspect of the invention, there is also provided an ink-jet printing method comprising a step of applying a first ink, a second ink and a treatment liquid so as to come into contact with each other in a liquid state on the surface of a printing medium;

said first ink containing as a first pigment a self-dipersing pigment having at least one anionic group coupled to the surface thereof directly or by way of another atomic group;

said second ink containing a second pigment and a polymeric dispersant for dispersing said second pigment in an aqueous medium, said second pigment being capable of dispersing in said aqueous medium by means of said polymeric dispersant, said polymeric dispersant containing at least one of a polymeric dispersant having the same polarity as that of the group coupled to the surface of said first pigment and a nonionic polymeric dispersant;

said treatment liquid containing at least one of a polyvalent metal ion and a salt thereof and destabilizing dispersion stability of at least one of said pigments contained in said inks when the treatment liquid and either of the inks are applied onto the printing medium so as to come into contact with each other in a liquid state, said treatment liquid being applied onto said printing medium prior to the application of said first ink and said second ink.

The above methods can provide a high quality image having a large area factor and a high OD value and being significantly free from haze. Additionally, the obtained image is excellent in terms of scratch resistance, fixation and various other respects.

While the reasons of the above advantages of the methods according to the invention are not clear, the inventors have confirmed the following facts as a result of a series of experiments carried out for the purpose of the present invention.

Firstly, when an ink containing a first pigment and a second pigment is applied to an area of a printing medium where a treatment liquid containing a polyvalent metal ion or a salt thereof has been applied, in such a way that the ink is overlapped the treatment liquid in a liquid state or come into contact with the latter, the ink dot in the area where the treatment liquid has been applied, expand considerably to produce an ink dot having a large diameter.

A technique of suppressing the phenomenon of mixed colors (bleeding) along the boundary lines of different colors of an image by applying a pigment ink of a polymeric dispersion type and an ink containing a polyvalent metal salt so as to bring them into contact with each other on a printing medium to destabilize the dispersion stability of the pigment is disclosed in a number of patent documents including U.S. Pat. No. 5,518,534. However, as a result of a number of experiments conducted by the inventors of the present invention, it was impossible for any combinations of inks described in the disclosed patent documents to produce ink dots having a large diameter that can be obtained by the above described methods of the invention.

On the basis of the above findings, the inventors believe that the effect of aggregation of a polyvalent metal ion and each of the pigments is alleviated as a result of the coexistence of the first pigment, the second pigment and the treatment liquid containing ions of the polyvalent metal or a salt thereof, although each of the pigments and ions of the polyvalent metal react with each other to produce an aggregated product.

More specifically, the aggregation caused by the reaction of the first pigment and the polyvalent metal ion and the reaction caused by the second pigment (including the polymeric dispersant) and the polyvalent metal ion differ from each other in terms of strength, so that the effect of aggregation of the stronger reaction is alleviated by that of the weaker reaction and additionally that the strong intermolecular force of the second pigment in the reactive solution Is alleviated by the presence of the first pigment As a result, the ink tends to spread horizontally on a sheet of paper.

In the case that the treatment liquid containing a polyvalent metal ion or a salt thereof reacts with the first pigment, haze can scarcely be observed. Thus, in spite of the increase of the dot diameter, the produced image shows sharp edges without haze or the like.

In addition, the ink shows excellent fixing properties since a large dot diameter can be obtained with a small amount of ink, as Pointed out above. Furthermore since the use of the first pigment makes it possible to reduce the amount of the polymeric dispersant in the ink, fixing properties are far more improved.

The fixing properties and the dot diameter are further improved when using a treatment liquid which can penetrate into the printing medium at an enhanced rate. This is because the treatment liquid that can penetrate into the printing medium is diffused quickly into the printing medium, and a sort of an ink receiving layer is foamed on the surface of the printing medium. Consequently the ink can easily permeate and spread along the surface of the printing medium, and forms dots while reacting with the treatment liquid, to form a large dot quickly on the surface of the printing medium.

Furthermore, in order to further improve the image quality, it is preferable to optimize the concentration of the polyvalent metal ion or a salt thereof in the treatment liquid and the amount of the treatment liquid applied on the printing medium.

The OD of the image formed on the printing medium is satisfactorily high when the concentration of a polyvalent metal ion or a salt thereof is about ⅓ of that of the pigment in the ink. It is not necessary to make the concentration excessively high.

The fixation of the ink is improved when the concentration of a polyvalent metal ion or a salt thereof is lower than the concentration of the pigment. Additionally, the treatment liquid may preferably be applied in an amount of ⅛ to ½ of the amount of application of the ink since the OD and the edge sharpness of the formed image are improved.

With the above arrangement, it is possible to form a high quality image with a high OD value and excellent fixing properties with a short fixing time on a printing medium without giving rise to any haze.

Figure 1:
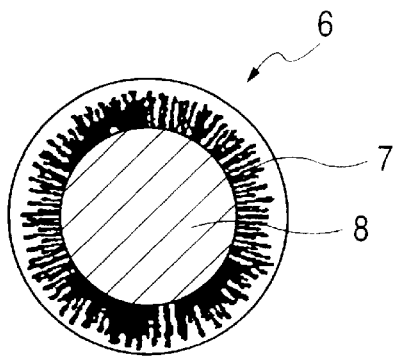
FIG. 1 is a schematic and presumptive illustration of the exudation of the reaction product that appears when an ink and a treatment liquid are made to react with each other.
Figures 2A, 2B, 2C:
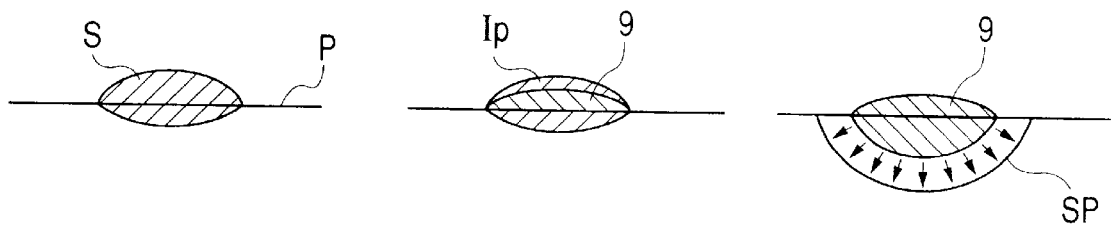
FIGS. 2A, 2B and 2C are schematic and presumptive illustrations showing how an ink dot is formed when a treatment liquid is applied to a printing medium and subsequently an ink is applied thereto in order to make the treatment liquid and the ink react with each other.

DETAILED DESCRIPTION OF THE PREFERRED EMBODIMENTS (Embodiment 1-1 of the Invention)

In an ink-jet printing method embodying the invention, an ink containing a first pigment and a second pigment and a treatment liquid, capable of reacting with the ink, containing a polyvalent metal ion or a salt thereof are brought in. The method comprises a process in which the treatment liquid is firstly applied to the printing medium and subsequently the ink is applied also to the printing medium in such a way that the treatment liquid and the ink come into contact with each other on the printing medium in a liquid state and react with each other to form a dot of image.
(Ink)

An ink that can be used in this embodiment of carrying out the invention contains a first pigment and a second pigment in a dispersed state in an aqueous medium. The first pigment is a self-dispersing pigment having at least one anionic group bound to the surface of the first pigment directly or by way of another atomic group, and the second pigment is capable of dispersing in the aqueous medium by means of a polymeric dispersant that may be nonionic. The ink further contains at least one of a polymeric dispersant having the same polarity as that of the group coupled to the surface of said first pigment and a nonionic polymeric dispersant in order to disperse the second pigment. The ink ingredients will be sequentially described below.
(First Pigment)

A self-dispersing pigment refers to a pigment that can be stably held in a dispersed state in water, an water-soluble organic solvent or a mixture liquid thereof without using a dispersant such as a water-soluble polymer and does not produce any aggregates of pigments in the liquid that can obstruct any normal ejection of ink from an orifice by means of an ink-jet recording technique.
(Anionic Self-Dispersing CB)

Such a pigment may typically contain at least one anionic group bound to the surface of said first pigment directly or by way of another atomic group. Specific examples include a pigment which contains a carbon black containing at least one anionic group bound to the surface directly or by way of another atomic group.

Examples of anionic groups bound to such carbon black include —COOM, —SO$_3$M, —PO3HM and —PO$_3$M$_2$ (where M represents a hydrogen atom, an alkali metal, ammonium or an organic ammonium compound).

Examples of alkali metals represented by M above include lithium, sodium and potassium. Examples of organic ammonium compounds represented by M above include mono-, di- and trimethylammoniums, mono-, di- and triethylammoniums and mono-, di- and trimethanolammoniums.

Of the above anionic groups, the use of —COOM or —SO$_3$M is preferable because they are highly effective for stabilizing the dispersed state of the carbon black.

Meanwhile, it is preferable for the purpose of the invention to use the carbon black onto the surface of which the above listed anionic groups are bound by way of another atomic group. Examples of the atomic groups include linear and branched alkylene groups with 1 to 12 carbon atoms, substituted and unsubstituted phenylene groups and substituted and unsubstituted naphthylene groups. Examples of substituents that may be bonded to a phenylene group or a naphthylene group for the purpose of the invention include linear and branched alkylene groups with 1 to 6 carbon atoms.

Examples of the anionic group bound to the surface of the carbon black by way of another atomic group include —C$_2$H$_4$COOM, —PhSO$_3$M and PhCOOM, where Ph represents a phenyl group; M is determined as above. The anionic group is however not limited thereto.

The carbon black to the surface of which an anionic group is coupled directly or by way of another atomic group can typically be prepared in a manner as described below.

A method for introducing —COONa to the surface of carbon black includes the method of treating a commercially available carbon black with hypochlorous acid.

A method for Introducing an —Ar—COONa group (where Ar represents an aryl group) includes the method of producing a diazonium salt by causing nitrous acid to react with an —NH$_2$—Ar—COONa group and then coupling the diazonium salt to the surface of carbon black, although the present invention is by no means limited thereto.

For the purpose of the present invention, 80% or more of the self-dispersion type pigment (first pigment) to be contained the ink in this embodiment of the invention has a particle diameter preferably between 0.05 and 0.3 $\mu$m, more preferably between 0.1 and 0.25 $\mu$m. A method for regulating the ink to meet the above requirement will be discussed In the following Examples.
(Second Pigment)

The second pigment to be used for an ink in this embodiment of the invention is selected from pigments that can be dispersed in the dispersion medium of ink, which may typically be an aqueous medium, by the action of a polymeric dispersant. In other words, pigments that can be stably dispersed in an aqueous medium, only when the polymeric dispersant is adsorbed to the surface of pigment particles. can preferably be used for the purpose of the present invention. Such black pigments typically include carbon black pigments such as furnace black, lamp black, acetylene black and channel black. Specific examples of carbon black pigments listed below can be used alone or in combination.
Carbon Black Pigments:

Raven 7000, Raven 5750, Raven 5250, Raven 5000 ULTRA, Raven 3500, Raven 2000, Raven 1500, Raven 1250, Raven 1200, Raven 1190 ULTRA-II, Raven 1170, Raven 1255 (tradenames, available from Columbia).

Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Valcan XC-72R (tradenames, available from Cabot).

Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (tradenames, available from Degussa).

No. 25, No. 33, No. 40, No. 47, No. 52, No. 900, No. 2300, MCF-88, MA600, MA7, MA8, MA100 (tradenames, available from Mitsubishi Chemical Co.).

Other black pigments that can be used for the purpose of the present invention include magnetic micro-particles of magnetite and ferrite and titanium black.

In addition to the above listed black pigments, blue pigments and red pigments can also be used for the purpose of the invention.
(Content and Ratio of Coloring Materials)

For the purpose of the invention, the content of the coloring materials including the first and second pigments is preferably between 0.1 and 15 wt %, more preferably between 1 and 10 wt %. The ratio of the first pigment to the second pigment is preferably between 5/95 and 97/3, more preferably between 10/90 and 95/5. Most preferably, the ratio of the first pigment to the second pigment is between 9/1 to 4/6.

From another point of view, it is preferable that the first pigment is contained to a large extent. As the first pigment is contained to a large extent, it is possible to achieve a high dispersion stability of ink, a high discharge stability of the ink-jet head and a high stability in terms of reliability due to a high ejection efficiency and a scarcely wet ejection port surface.

Additionally, in view of the fact that an ink containing the second pigment adsorbed to the polymeric dispersant to a small extent can spread effectively along the surface of paper, it is assumed that a uniform thin film of the polymeric dispersant is formed on the surface, so that the image formed on the surface of paper has a high scratch resistance.

The polymeric dispersant that is designed to disperse the second pigment in the aqueous medium preferably has a function of being adsorbed to the surface of the particles of the second pigment so as to stably disperse the second pigment in the aqueous medium. Examples of polymeric dispersants that can be used for the purpose of the invention include anionic polymeric dispersants and nonionic polymeric dispersants.

(Anionic Polymeric Dispersant)

Examples of anionic polymeric dispersants that can be used for the purpose of the invention include polymers obtained from a monomer which functions as a hydrophlic group and a monomer which functions as a hydrophobic group and salts thereof. Specific examples of monomers which functions as a hydrophilic group include styrene sulfonic acid, α, β-ethylenically unsaturated carbonic acid, derivatives of α, β-ethylenically unsaturated carbonic acid, acrylic acid, derivatives of acrylic acid, methacrylic acid, derivatives of methacrylic acid, maleic acid, derivatives of maleic acid, itaconic acid, derivatives of itaconic acid, fumaric acid, derivatives of fumaric acid. Specific examples of monomers which functions as a hydrophilic group include styrene, derivatives of styrene, vinyltoluene, derivatives of vinyltoluene, vinylnaphthalene, derivatives of vinylnaphthalene, butadiene, derivatives of butadiene, isoprene, derivatives of isoprene, ethylene, derivatives of ethylene, propylene, derivatives of propylene, alkyl esters of acrylic acid and alkyl esters of methacrylic acid.

For the purpose of the invention, salts non-limitatively includes onium compounds of hydrogen, alkali metals, ammonium ion, organic ammonium ion, phosphonium ion, sulfonium ion, oxonium ion, stibonium ion, stannonium ion, iodonium ion and other onium ions. Furthermore, if appropriate, a polyoxyethylene group, a hydroxyl group, acrylamide, acrylamide derivatives, dimethylaminoethyl methacryate, ethoxyethyl methacrylate, butoxyethyl methacrylate, ethoxytriethylene methacrylate, methoxypolyethyleneglycol methacrylate, vinylpyrrolidone, vinylpyridine, vinylalcohol or alkylethers may be added to any of the above polymers or any of the salts thereof.

(Nonionic Polymeric Dispersant)

Examples of nonionic polymeric dispersants that can be used for the purpose of the present invention include polyvinylpyrrolidone, polypropyleneglycol and vinylpyrrolidone-vinyl acetate copolymer.

The appropriately selected combination of the first pigment, the second pigment and the polymeric dispersant are dispersed and dissolved in an aqueous medium to obtain an ink to be used in this embodiment of the invention. If a self-dispersion type pigment containing at least one anionic group bound to the surface of said first pigment directly or by way of another atomic group is used as the first pigment, the stability of the ink can be secured by adding at least one of an anionic polymeric dispersant and a nonionic polymeric dispersant in combination with the polymeric dispersant.

While the ratio of the second pigment to the polymeric dispersant for dispersing the former is preferably between 5:0.5 and 5:2 by weight, the present invention is by no means limited thereto.

(Aqueous Medium)

The aqueous medium to be used as a medium for dispersing the first and second pigments may be simply water or contain both water and a water-soluble organic solvent. Examples of water-soluble organic solvents that can be used for the purpose of the invention include alkyl alcohols with 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol and n-penthanol; amides such as dirnethylformamide and dimethylacetoamide; ketones and keto alcohols such as acetone, diacetone alcohol; ethers such as tetrahydrofuran and dioxane; oxyethylene or oxypropylene copolymers such as diethyleneglycol, triethyleneglycol, tetraethyleneglycol, dipropyleneglycol, tripropyleneglycol, polyethyleneglycol and polypropyleneglycol: alkyleneglycols having an alkylene group with 2 to 6 carbon atoms such as ethyleneglycol, propyleneglycol, trimethyleneglycol, triethyleneglycol and 1,2,6-hexanetriol; glycerol; lower alkylethers such as ethyleneglycolmonomethyl(or ethyl) ether, diethyleneglycolmonomethyl(or ethyl) ether and triethyleneglycolmonomethyl(or ethyl) ether; lower dialkylethers of polyhydric alcohols such as triethyleneglycoldimethyl(or diethyl)ether and tetraethyleneglycoldimethyl(or diethyl)ether; alkanol amines such as monoethanol amine, diethanol amine, triethanol amine; sulforan, N-methyl-2-pyrrolidone, 2-pyrrolidone and 1,3-dimethyl-2-imidazolidinone. Any of the above listed water-soluble organic solvents may be used independently or as a mixture. While there is no limit to the content of the water-soluble organic solvent for the purpose of the invention, it is preferably less than 60 wt %, more preferably between 5 and 40 wt % of the ink.

(Ink Permeability of Recording Medium)

With regard to the permeability of the printing medium to the ink containing the above described ingredients, if the Ka value is adjusted to less than 1 $(ml \cdot m^{-2} \cdot msec^{-\frac{1}{2}})$, it is possible to produce image dots with a highly uniform density and sharp edges and are outstanding in terms of fixing speed and fixing effect to the printing medium, using a treatment liquid together as described below. Now, the permeability of the ink to the printing medium will be discussed below.

When the permeability of the ink is expressed in terms of the volume of ink per 1 $m^2$, it is known that the permeated volume of ink V (milliliter/$m^2$=$\mu$m) that permeates the recording medium per unit area at time t after the ejection of ink drops is expressed by Bristow formula as shown below;

$$V = Vr + Ka(t-tw)^{1/2},$$

where t>tw.

Immediately after ink drops fall onto the surface of the printing medium. the ink is mostly absorbed by the undulations on the surface (the coarse areas of the surface) of the recording medium and practically does not penetrate into the inside of the printing medium. The time of duration of this stage is expressed by tw (wet time) and the absorbed volume of ink absorbed by the undulations on the surface of the printing medium is expressed by Vr. When the elapsed time since the falling of ink drops exceeds tw, the permeated volume of ink V increases by an amount proportional to the ½-th power of the time (t–tw). Ka is the constant of proportionality for this increase, which is determined according to the rate of permeation.

The Ka value was determined in an experiment by means of a dynamic permeability testing apparatus S for liquid that utilizes the Bristow formula (available from Toyo Seiki). In the experiment, PB paper available from Canon who is the applicant of the present patent application was used as a printing medium (recording paper). PB paper refers to recording paper that can be used for both copying machines and LBPs utilizing electrophotography and printing operations using ink-jet recording apparatus.

In the experiment, PPC paper available from Canon that is developed also for electrophotography was also used to obtain similar results.

The Ka value is determined depending on the type and the amount of the surfactant used. For instance, the permeability is increased when a nonionic surfactant containing ethyleneoxide-2,4,7,9-tetramethyl-5-decyne-4,7-diol (to be expressed hereinafter by Acetylenol EH: tradename, available from Kawaken Fine Chemical) is added.

The ink containing no Acetylenol EH (content: 0%) shows a low permeability so that the ink has the characteristics of an overlay type ink, which will be defined hereinafter. The ink containing Acetylenol EH in a content of 1% shows a high permeability so that the ink quickly permeates the recording medium and has the characteristics of a highly permeable ink, which will also be defined hereinafter. The ink containing Acetylenol EH in a content of 0.35% shows a medium permeability so that the ink moderately permeates the recording medium and has the characteristics of a moderately permeable ink, which will also be defined hereinafter.

Table 1 above shows the Ka value, the content (%) of Acetylenol EH and the surface tension (mN/m ) of each of the overlay type ink, moderately permeable ink and highly permeable ink. The ink with a higher Ka value shows a higher permeability to the printing medium, or the recording paper, that is, the ink with a low surface tension shows a higher permeability.

As pointed out above, the values of Ka were determined in an experiment by means of a dynamic permeability testing apparatus S for liquid that utilizes the Bristow formula (available from Toyo Seiki). In the experiment, PB paper available from Canon was used as a printing medium (recording paper). In the experiment, PPC paper available from Canon was also used to obtain similar results.

Inks defined as a highly permeable ink contains Acetylenol EH in a content of less than 0.7% and good results were obtained by such ink in terms of permeability. In this embodiment of the invention, the reference value of permeability to the ink is preferably less than the Ka value of the overlay type ink, or 1.0 (ml·m$^{-2}$·msec$^{1/2}$), more preferably less than 0.4 (ml·m$^{-2}$·msec$^{-1/2}$).

(Addition of Dyes)

A dye may also be added to the ink in the above described embodiment of the invention. An ink containing a dye in addition to the first pigment, the second pigment and the dispersant for dispersing the first and second pigments in an aqueous medium can form excellent image dots on a printing medium with a short fixing time, using a treatment liquid together, which will be described hereinafter. While the aggregational force of the second pigment is lessened by the presence of the first pigment as described above, it is further lessened by the addition of the dye so that an uneven printed image due to cracks that can occur on a recording medium having an ink absorptivity lower than that of plain paper can be effectively prevented from taking place. The dye that is used for the purpose of the invention preferably has the same polarity as that of the group coupled to the surface of the first pigment. Thus, the dye may be an anionic dye.

(Anionic Dyes)

The anionic dye that is used for the purpose of the invention and soluble to an aqueous medium may be selected from known acidic dyes, direct dyes and reactive dyes. The dye preferably has a chemical structure having a disazo or trisazo skeleton structure. It is also preferable to use two or more dyes with different chemical structures. For the purpose of the invention, a dye other than a black dye such as a cyan, magenta or yellow dye may be used if it does not significantly affect the color tone of the ink.

(Ratio of Added Dyes)

A dye may be added to the ink in this embodiment of the invention in a content between 5 to 60 wt % based on the total coloring materials. However, from the viewpoint of utilizing the effect of combining the first and second pigments, the dye is added in a content of less than 50% based on the total coloring materials. In the case of an ink to be used on plain paper with emphasis on the printing properties, the dye is added in a content between 3 and 30 wt % based on the total coloring materials.

(Treatment Liquid)

The treatment liquid that can be employed in this embodiment of the invention may preferably contain a polyvalent metal ion or a salt thereof, which is capable of reacting with at least one of the pigments in the ink. An example of the polyvalent metal ion includes a polyvalent cationic ion, and examples of the polyvalent cationic ion include $Ca^{++}$, $Cu^{++}$, $Ni^{++}$, $Mg^{++}$, $Zn^{+++}$, $Ba^{++}$, $Al^{+++}$, $Fe^{+++}$, $Cr^{+++}$, $Co^{++}$, $Fe^{++}$, $La^{++}$, $Nd^{+++}$ and $Y^{+++}$. Anions that can be coupled with these cations to form a salt typically include $Cl^-$, $NO_3^-$, $I^-$, $Br^-$, $ClO_3^-$ and $CH_3COO^-$, although not limited thereto. The solution containing the above listed polyvalent metal cationic ions has a salt concentration preferably between 0.01 and 10% by weight, more preferably between 1 and 5% by weight, most preferably between 1 and 3% by weight.

The treatment liquid basically shows a color tone that does not affect the color tone of the image formed by the ink used with the liquid. For instance, it may be colorless. However, in this embodiment of the invention, the treatment liquid is made to positively participate in the image forming process by adding a coloring material thereto. Coloring materials that can be used to color the treatment liquid includes direct dyes, acidic dyes, basic dyes, disperse dyes and pigments. From the viewpoint that the treatment liquid contains at least one of a polyvalent metal ion and a salt thereof, and destabilizes the dispersion of the pigments in the ink to be used with the treatment liquid, the coloring material contained in the treatment liquid preferably does not react with the polyvalent metal or the salt thereof but maintains its solubility. Examples of coloring materials that can be used for the treatment liquid include C. I. Acid Yellow 23: C. I. Acid Red 52, 289; C. I. Acid Blue 9; C. I. Reactive Red 180; C. I. Direct Blue 189, 199; C. I Basic Yellow 1, 2, 11, 13, 14, 19, 21, 25, 32, 33. 36, 51; C I. Basic Orange 2, 15, 21, 22; C. I Basic Red 1, 2, 9, 12, 13, 37, 38, 39, 92; C. I Basic Violet 1, 3, 7, 10, 14; C. I Basic Blue 1, 3, 5, 7, 9, 19, 24, 25, 26, 28, 29, 45, 54, 65; C. I. Basic Green 1, 4; C. I Basic Brown 1, 12; C. I Basic Black 2, 8 and magenta dyes expressed by general formula (I) shown below:

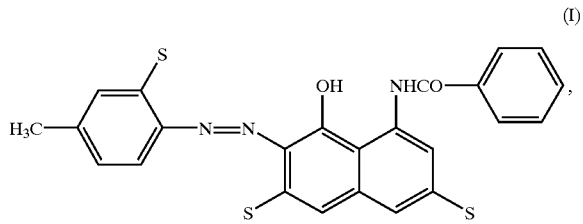

(I)

where "S" represents —$SO_3X$ (where X represents an alkali metal or the like).

For the purpose of the invention, one of the above water-soluble dyes may be used alone or two or more of them may be used in combination. The content of the water-soluble dye(s) is preferably between 0.1 and 20 mass % with respect to the total of the treatment liquid.

The treatment liquid containing a polyvalent metal or a salt thereof, water and a water-soluble organic solvent. It may additionally contain one or more other additives. The water-soluble organic solvent can be selected from the group consisting of amides such as dimethylformamide, dimethylacetoamide; ketones such as acetone; ethers such as tetrahydrofuran and dioxane; polyalkyleneglycols such as polyethyleneglycol and polypropyleneglycol; alkyleneglycols such as ethyleneglycol, propyleneglycol, butyleneglycol, triethyleneglycol, 1,2,6-hexanetriol, thiodiglycol, hexyleneglycol and diethyleneglycol; lower alkylethers of polyhydric alcohols such as ethyleneglycolmethylether, diethyleneglycolmonomethylether and triethyleneglycolmonomethylether and monohydric alcohols such as ethanol, isopropyl alcohol, n-butyl alcohol and isobutyl alcohol as well as glycerol, N-methyl-2-pyrrolidone, 1-3-dimethylimidazolidinone, triethanolamine, sulforan and dimethylsulfoxide. While the content of the water-soluble organic solvent is not subjected to any particular limitations, it is preferably between 5 and 60 wt %, more preferably between 5 and 40 wt % of the total treatment liquid.

In this embodiment of the invention, the treatment liquid is preferably so regulated that it can permeate the printing medium to a large extent in order to improve the fixing speed and fixability of the image dots to the printing medium. In more specific terms, the treatment liquid preferably has a Ka value of not less than 5.0 $(ml \cdot m^{-2} \cdot msec^{-\frac{1}{2}})$ as obtained by means of the Bristow formula for the permeation speed thereof.

As for the sequence of application of the ink and the treatment liquid to the printing medium in this embodiment of the invention, basically the treatment liquid is applied to the printing medium prior to the application of the ink in order to achieve the intended effect.

As for the arrangement for obtaining the above sequence of application, when using a serial type head for instance, the case where scanning is conducted plural times on the same area with paper feeding conducted therebetween is also within the scope of the invention.

As described above, an ink is applied to the printing medium immediately after the application of the treatment liquid to the printing medium. It should be noted here once again that it is not necessary to apply only one drop of the ink at a time.

For instance, two drops of the ink may be applied immediately after applying the treatment liquid. If such is the case, it is preferable that the ink drop to be applied firstly contains more second pigment then the first pigment, while that to be applied secondly contains more first pigment than the second pigment.

When a plurality of ink drops are applied in a manner as described above, the total volume of the applied ink is preferably made substantially equal to the amount of the ink when applying one ink droplet. In other words, in this embodiment of the invention, if a given volume of the ink is divided and applied in a plurality of times, the volume of each drop becomes smaller as the number of times increases to obtain the intended result.

There are basically no limitations to the time between the application of the treatment liquid and that of the ink in this embodiment of the invention so long as the intended result is obtained as in the case of the sequence of application.

The reaction of the applied ink and the treatment liquid may proceed differently depending on the time between the application of the treatment liquid and the application of the ink. Even if the time is short, it has been observed that each dot formed by applying the treatment liquid and the ink one after the other on the printing medium gives a peripheral area, or an edge area, where the pigments and the treatment liquid react satisfactorily to give rise to the effect of minimizing the appearance of haze.

On the basis of these findings, the reaction between the ink and the treatment liquid refers not only to the overall reaction but also to every partial reaction that may occur in part of an area where the ink and the treatment liquid are applied one after the other. Such part may be an edge section of an ink dot. For the purpose of the invention, any mode of the reaction between the ink and the treatment liquid is defined to be within the category in which they come into contact with each other in a liquid state.

The hues (types) and the density of the ink to be used for this embodiment, the number of hues and the number of grades of density may vary so long as the above described sequence of application is taken. For instance, black (Bk), yellow (Y), magenta (M) and cyan (C) are generally used and each ink may be dark or pale. For instance, a yellow ink, magenta ink and/or cyan ink may be used as a mixed ink along with a treatment liquid in this embodiment of the invention to apply these inks and the treatment liquid in the above described sequence.

Most preferably, in this embodiment of the invention, a black ink is provided in the form of a mixed ink containing both the first pigment and the second pigment because, with such an arrangement, the effect of increasing the OD value and that of minimizing haze are maximized from the viewpoint of the quality of printed letters and other characters.

The ink may be applied to the printing medium by application, by a method of directly brining the ink into contact with the printing medium or by some other method within the scope of the present invention. However, most preferably, an ink-jet printing method using printing heads Is used for the purpose of the invention. The combination and the arrangement of the printing heads operating as ejection ports may be determined according to the combination of the types of the inks and the treatment liquid as well as the above described sequence of application.

More specifically, the above described sequence of application can be achieved by arranging the heads of the inks and the treatment liquid in the direction along which the printing head is moved relative to the printing medium.

The printing head that can be used for applying the inks and the treatment liquid for the purpose of the invention include so-called a full-multi-type printing head whose ink ejection ports are arranged in an area corresponding to the entire width of the area to be printed of the printing medium and a serial type printing head which moves for scanning with respect to the printing medium.

While any known ink ejection method such as a piezo method may be used for the printing head, the method of producing bubbles in the ink or the treatment liquid by utilizing thermal energy to eject the ink and the treatment liquid by the pressure of bubbles may most preferably be used for the purpose of the invention.

The areas where the ink and the treatment liquid which have been ejected by the respective printing heads lie one after the other is normally controlled for each of the pixels of the printed image in such a way that the inks and the treatment liquid are applied on the same area to overlap each other. However, the present invention is not limited thereto. For instance, an ink dot may partly overlaps with the corresponding drop of the treatment liquid if the intended result is obtained. Similarly, the treatment liquid may be thinned out with respect to the data for each pixel and applied, so that the pigments may react with the treatment liquid seeping or flowing out from adjacently located pixels. In other words, any form of utilizing the reaction of the ink and the treatment liquid is within the scope of the present invention.

(Embodiment 1-2 of the Invention)

Now, another embodiment of the invention will be described below.

In this embodiment of the invention, a highly permeable treatment liquid is employed in the case of the above-described embodiment in order to achieve a higher fixing speed.

A high fixing speed is indispensable for obtaining a high printing speed and improving the throughput. The throughput can be improved directly by increasing the drive frequency of the printing head and the moving speed of the printing medium. However, if the ink on the printing medium discharged after the completion of the printing operation is not fixed well, the subsequent operations will become cumbersome. Additionally, if the discharged sheets of paper are laid one after another, the unfixed ink on the sheets can smear the printing medium.

Of the various factors that relate to increasing the printing speed, the discharging speed of the paper sheet on which the printing operation has been completed is important and depends on the conveyance speed of the printing medium and/or the scanning speed of the printing head.

In the case of an ink-jet printing apparatus comprising a so-called full-multi-type printing head, the conveyance speed of the printing medium in the printing operation directly refers to the discharging speed of the paper sheet. In the case of an ink-jet printing apparatus comprising a serial type printing head, the scanning speed of the printing head results in relating to the discharging speed of the printing medium after the completion of the printing operation. The conveyance speed of the printing medium correlates with the resolution of the printed image or the ink ejection cycle for the pixels as expressed by using the parameter of dot density. In the case of an arrangement where a single pixel is printed by an ink ejected from a plurality of printing heads, the ejection cycle for the pixel and the above conveyance speed correlate with each other provided that the resolution is invariable.

In this embodiment of the invention, a relatively high fixing speed can be achieved by using a treatment liquid with a high permeation rate to the printing medium even when the mixed ink has a low permeation rate in order to improve the OD value.

(Embodiment 2 of the Invention)

An ink containing the first pigment and the second pigment is used in the above described first embodiment of the invention; two Inks containing respectively the first pigment and the second pigment are used in this embodiment of the invention.

(Embodiment 2-1 of the Invention)

In this embodiment of the invention, a first ink containing a first pigment, a second ink containing a second pigment and a treatment liquid capable of reacting with the first and second inks are applied onto the surface of the printing medium in such a way that the inks and the treatment liquid come into contact with each other on the surface of the printing medium in a liquid state. The treatment liquid is applied to the printing medium prior to the application of the first ink and the second ink to provide the above described effects of the present invention. The first ink containing the first pigment and the second ink containing the second pigment can be prepared by using the ingredients listed above for the first embodiment of the invention. The condition for the density of each of the pigments as described for the first embodiment of the invention is also applicable to this embodiment of the invention.

EXAMPLES

Now, the present invention will be described by way of examples and also by referring to the accompanying drawings, although the present invention is by no means limited thereto, and they may be combined in various different ways and applied to different technological fields facing similar problems.

Example 1-1

Figure 3:
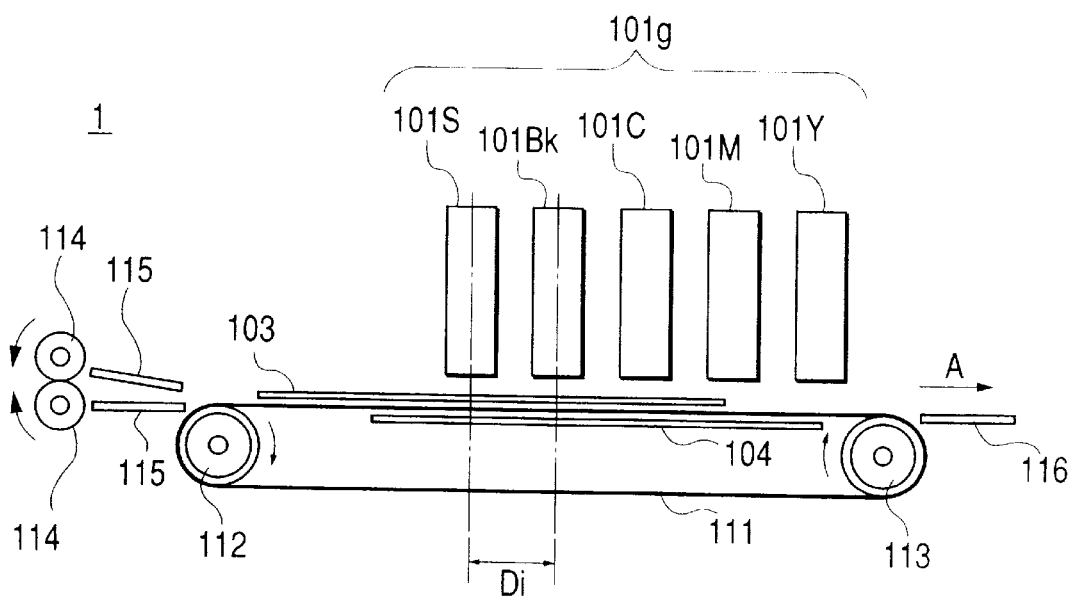
FIG. 3 is a schematic lateral view of a printing apparatus with which an ink-jet printing method according to the invention can be carried out.

FIG. 3 is a schematic lateral view of a full-line type printing apparatus 1 used in the example, schematically illustrating the configuration thereof. The printing apparatus 1 employs an ink-jet printing method in which a plurality of full-line type printing heads are arranged at predetermined respective positions along the conveyance direction of the recording medium, or the printing medium, (as indicated by arrow A in FIG. 3) to eject the ink and the treatment liquid. The apparatus operates under the control of a control circuit as shown in FIG. 4 and will be described hereinafter.

The group of heads 101g of the apparatus include printing heads 101S, 101Bk, 101C, 101M and 101Y, each of which comprises about 7,200 ink ejection ports arranged in the transversal direction of a recording paper 103 that is conveyed in the direction of A in FIG. 3 (in the direction perpendicular to the drawing), and are adapted to print an image on a sheet of recording paper having the A3 size at largest. The recording paper 103 is conveyed in the direction of A by means of a pair of regist rollers 114 driven by a conveyance motor and guided by a pair of guide plates 115 so as to be registered at the front end thereof before it is conveyed by a transfer belt 111. The transfer belt 111 being an endless belt is retained by a pair of rollers 112, 113 and the vertical displacement of the upper portion thereof is restricted by a platen 104. The recording paper 103 is conveyed as the roller 113 is driven to rotate. The recording paper 103 adheres to the transfer belt 111 by static electricity. The roller 113 is driven to rotate in the direction for conveying the recording paper 103 in the direction of arrow A by means of a drive source (not shown) such as a motor. While the recording paper 103 is conveyed on the transfer belt 111, an image Is recorded by the group of recording heads 101g and then the recording paper 103 is discharged onto a stocker 116.

As pointed out above, the group of recording heads 101g include a head 101S for discharging the treatment liquid, a head 101Bk for ejecting a black ink as described above by referring to the first embodiment of the invention, and color ink heads (a cyan head 101C, magenta head 101M and yellow head 101Y), which are arranged in the conveyance direction of the recording paper 103 as shown in FIG. 3. Black characters and/or color images can be printed by ejecting the treatment liquid and the color inks from the respective printing heads.

Figure 4:
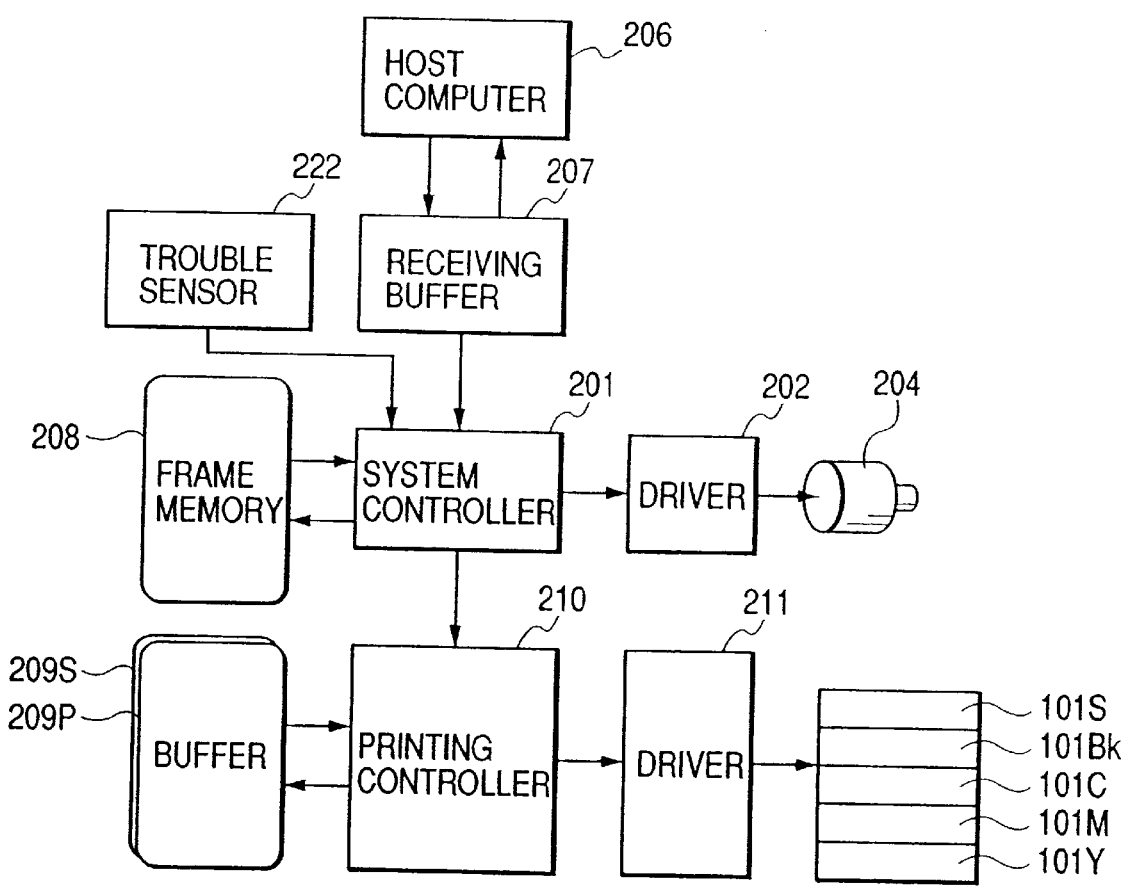
FIG. 4 is a schematic block diagram of the control system of the printing apparatus of FIG. 3.

FIG. 4 is a schematic block diagram of the control system of the printing apparatus 1 of FIG. 3.

Referring to FIG. 4, a system controller 201 comprises a microprocessor, a ROM for storing the control program to be used in the apparatus and a RAM for providing work areas for the processing operations of the microprocessor and is adapted to control the entire printing operation of the apparatus. A motor 204 is controlled by way of a driver 202 for its driving operation and adapted to drive the roller 113 of FIG. 3 to rotate, thereby conveying the recording paper.

A host computer 206 transfers all the Information necessary to the printing operation of the printing apparatus 1 and controls the printing operation. A receiving buffer 207 temporarily stores the data from the host computer 206 until the data are read by the system controller 201. A frame memory 208 is used to expand the data to be used for the printing operation into image data and has a memory size necessary for the printing operation. While the frame memory 208 has a memory capacity for storing the data for one sheet of the recording paper in this example, the present invention is by no means limited by the capacity of the frame memory.

Buffers 209S, 209P temporarily store the data to be used for the printing operation and their memory capacity varies depending on the number of ejection ports of the printing heads. A printing control section 210 appropriately controls the operation of driving the printing heads according to the instructions from the system controller 201 in terms of drive frequency, data to be used for printing and so on and prepare data necessary for discharging the treatment liquid. A Driver 211 drives the printing head 101S for discharging the treatment liquid and the printing heads 101Bk, 101C, 101M and 101Y for ejecting the ink of the respective colors and is controlled by signals from the printing control section 210.

With the above described arrangement, printing data are transmitted from the host computer to the receiving buffer 207 and temporarily stored in the latter. Then, the system controller 201 reads out the stored printing data and expand them to the buffers 209S, 209P. It is also possible to detect any abnormal conditions of the apparatus including paper jam, out of ink and out of paper by means of various detection signals from an abnormality sensor 222.

The printing control section 210 prepares data necessary for discharging the treatment liquid on the basis of the image data expanded to the buffers 209S, 209P. Then, the printing control section 210 controls the ejecting operation of each of the printing heads according to the printing data and the data on the treatment liquid stored in the buffers 209S, 209P.

In this example, an ink with a low permeation speed (to be referred to as overlay type ink hereinafter) was used for the black ink ejected from the head 101Bk and a treatment liquid and inks with a high permeation speed (to be referred to as highly permeable ink hereinafter) were used respectively for the treatment liquid, the cyan ink, the magenta ink and the yellow ink ejected from the respective heads 101S, 101C, 101M and 101.

The treatment liquid and the inks used in this example had the respective compositions listed below. The contents of the ingredients are expressed in parts by weight (the total of the ingredients is 100 parts by weight, the same as follows).

The Ka value of the black ink was 0.33 (ml·m$^{-2}$·msec$^{-\frac{1}{2}}$). The pigment dispersion solutions 1 and 2 were prepared in a manner as described below.

Pigment Dispersion Solution 1

10 g of carbon black with a surface area of 230 m$^2$/g and a DBP oil absorbed amount of 70 ml/10 g, 3.41 g of p-aminobenzoic acid and 72 g of water were mixed well, and then 1.62 g of nitric acid was added thereto dropwise. Then, the mixture was stirred at 70° C. Several minutes after, a solution obtained by dissolving 1.07 g of sodium nitrite in 5 g of water was added to the mixture, which was then stirred further for an hour. The resultant slurry was filtered through Toyo Filter Paper No. 2 (tradename, available from Advantis). The resulting pigment particles were thoroughly washed with water and dried at 90° C. in an oven, and then water was added to the pigment to prepare an aqueous solution of the pigment in a pigment concentration of 10 wt %. With the above process, it was possible to obtain the pigment dispersion solution 1 containing anoinically charged self-dispersion type carbon black in a dispersed state, where a hydrophlic group is coupled to the surface by way of a phenyl group as expressed by the formula below.

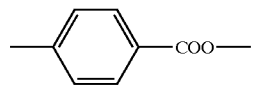

Pigment Dispersion Solution 2

The pigment dispersion solution 2 was prepared in a manner as described below. 14 parts of styrene-acrylic acid-ethyl acrylate copolymer (acidic value: 180, average molecular weight: 12,000), 4 parts of monoethanol amine and 72 parts of water were mixed and heated to 70° C. in a water bath to completely dissolve the resin contents. Since the resin may not be dissolved perfectly when the resin concentration is low, a highly concentrated resin solution may be prepared in advance and diluted to produce a resin solution with a desired concentration level. 10 parts of a carbon black (MCF-88: tradename, pH 8.0, available from Mitsubishi Chemical Co.) capable of being dispersed in an aqueous medium only by the effect of a dispersant was added to the solution and subjected to premixing for 30 minutes. Subsequently, the solution was subjected to the following process to obtain the pigment dispersion solution 2 where the carbon black (MCF-88) was dispersed in the aqueous medium by the dispersant.

dispersing machine: Side Grinder (available from Igarashi Kikai Co.)
grinding medium: zirconia beads (diameter: 1 mm)
filling factor of grinding medium: 50% (by volume)
grinding time: 3 hours
centrifugal separation treatment: 12.000 rpm, 20 min.

Using the black ink of this example, a treatment liquid containing two different cationic compounds with different polarities reacts with an ink containing a self-dispersion type carbon black, a carbon black that could be dispersed only by a polymeric dispersant and a polymeric dispersant in a mixed and dispersed state.

In this example, the ink ejection ports of each printing heads are arranged at a density of 600 dpi and an image is printed with a dot density of 600 dpi in the direction of conveyance of the recording paper. As a result, the dot density of the image formed on the recording paper by the printing operation is 600 dpi both in the row direction and the column direction. The ejection frequency of each head is 4 Hz and hence the recording paper is conveyed at a rate of about 170 mm/sec. The distance Di (see FIG. 3) separating the ink head 101Bk for the mixed ink and the head 101S for the treatment liquid is 40 mm and hence the time period between the ejection of the treatment liquid and the ejection of the ink is about 0.24 sec.

Each of the printing heads ejects 15 pl (picoliter) of ink at each ejection. A supplementary test was conducted by varying the time period between the ejection of the treatment liquid S and the ejection of the black ink Bk down to 0.1 sec. to obtain a similar result.

Example 1-2

All the process of Example 1-1 were conducted in this example except that the composition of the treatment liquid and that of the black ink of Example 1-1 were modified in a manner as shown below.

The Ka value of the black ink was 0.33 (ml·m$^{-2}$·msec$^{-1/2}$).

Example 1-3

All the process of Example 1-1 were conducted in this example except that the composition of the treatment liquid and that of the black ink of Example 1-1 were modified in a manner as shown below.

The Ka value of the black ink was 0.33 (ml·m$^{-2}$·msec$^{-1/2}$).

Comparative Example 1

To compare with Examples 1-1 through 1-3, an ink containing only the ingredients listed below was prepared by using the pigment dispersion solution 2 prepared in the same manner as in Example 1-1. The prepared ink was used for a printing operation conducted under the same conditions as in Example 1-1. No treatment liquid was used in this comparative example.

Comparative Example 2

The ink prepared as in Comparative Example 1 was used. The printing process of Comparative Example 1 was conducted except that a Bk head with an ink ejection amount of about 30 pl per ejection was used and the ink was applied in an amount of 30 pl per pixel. The evaluations given to the printed objects of Examples 1-1 through 1-3 and Comparative Examples 1 and 2 are shown in Table 12 below.

In each of Examples 1-1 through 1-3 and Comparative Examples 1 and 2, a predetermined image was printed on PB paper available from Canon and the OD value was determined in the black areas. Referring to Table 12, the OD value was determined by means of a Macbeth densitometer. The time necessary for obtaining water-resistance refers to the time after which any distortion of the printed image is not visually observable when water is dropped onto the printed object produced as a result of a printing operation. The fixation refers to the time after which no ink is transferred onto the rear surface of the discharged printed object. As for feathering, the ink dots were observed through a magnifier to find hazy areas around the dots as well as feathering and each specimen was rated as "A" when no feathering was observed and as "B" when feathering was observed.

As seen from Table 12, in the above examples, the obtained printed objects were better than any comparable existing printed objects using a conventional pigment ink particularly in terms of OD value, the time necessary for obtaining water-resistance and fixation.

As for OD value, in every example cited above, in which a treatment liquid is applied to an ink containing a pigment not requiring any dispersant, a pigment capable of being dispersed by a dispersant and a polymeric dispersant, the above-described effect is brought about to give a higher OD value when compared with comparative examples where only a pigment or a dye was applied after the application of the treatment liquid.

When the specimens of the examples and the comparative examples were compared for feathering (haze and exudation) and sharpness in edge sections in terms of the time period between the ejection from the head 101S and the ejection from the head 101Bk, specimens of the examples were found to be excellently superior to those of the comparative examples. A similar result was obtained when the time period between the ejection of the treatment liquid and the ejection of the black ink Bk in Table 12 was set to 0.1 seconds.

A multi-type printing apparatus having a configuration as described above is operated in such a way that the printing heads were held stationary during the printing operation and hence the time required for conveying the recording paper is almost equal to the time required for the printing operation. Therefore, such an apparatus is particularly suitable for high speed printing. Thus, by applying the present invention to such a high speed printing apparatus, the high speed printing performance of such an apparatus is further improved to make it possible to print high quality images that have a high OD value and are free from bleeding and haze.

While the printing apparatus used in the above examples was that of a most popular type, it may be replaced by a copying machine or the printing section of a facsimile machine without any problem.

The effects listed in Table 12 can be obtained when two heads are used for a mixed black ink and each of the two heads ejects about 8 pl of ink at a time to make the total amount of ejected ink to be equal to about 16 pl instead of using a single head for the mixed black ink.

Example 2

Figure 5:
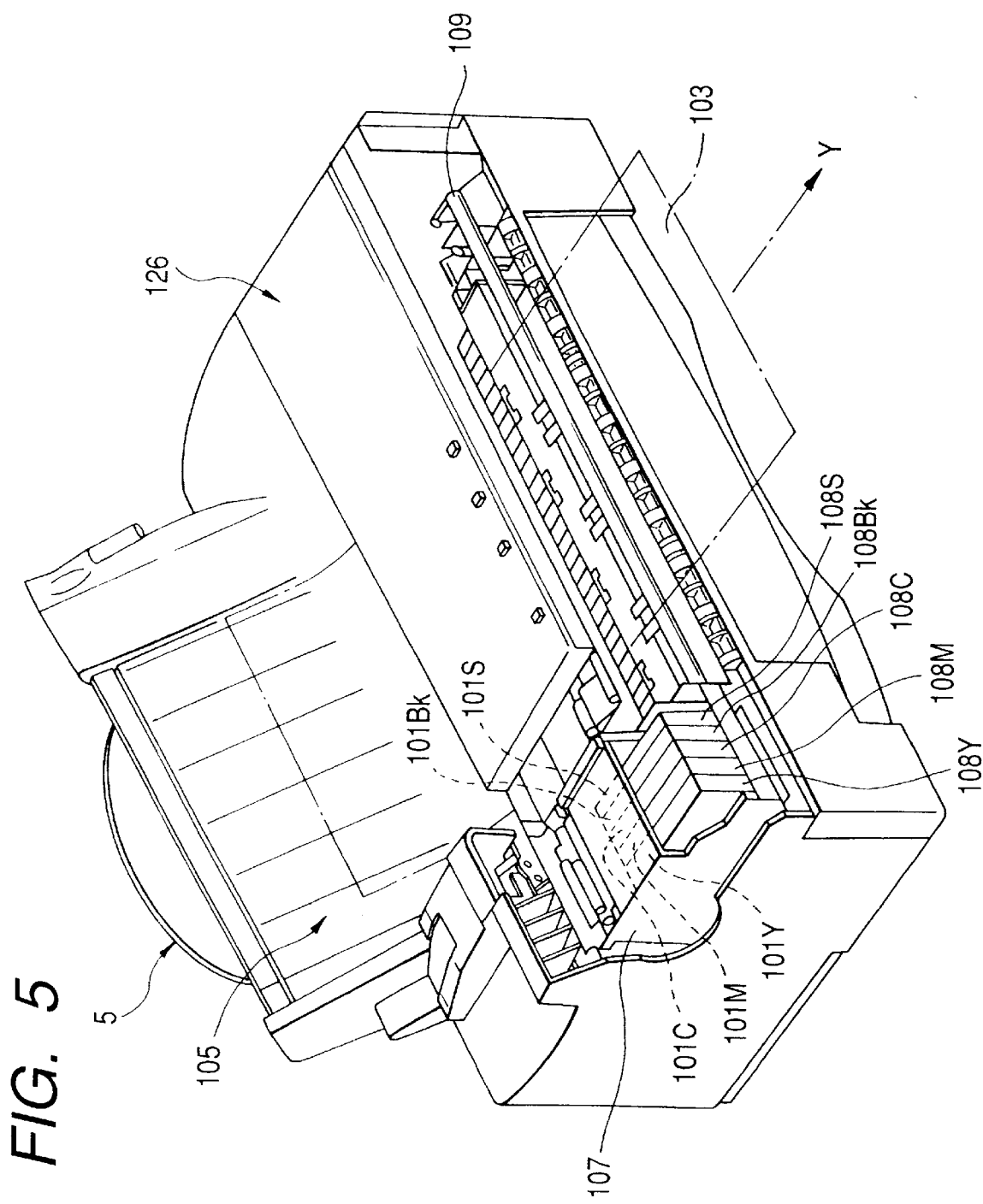
FIG. 5 is a schematic perspective view of another printing apparatus with which an ink-jet printing method according to the invention can be carried out.

FIG. 5 is a schematic perspective view of the serial type printing apparatus used in Example 2, illustrating the configuration thereof. The method of the present invention, in which the treatment liquid is applied to the printing medium first and subsequently an ink is applied thereto so as to cause them to react with each other, can obviously be used not only for full-line type printing apparatus but also for serial type printing apparatus. The components in FIG. 5 that are similar to those of FIG. 3 are denoted respectively by the same reference symbols and will not be described any further. Referring to FIG. 5, the recording paper 103, or the printing medium, is inserted from a paper feeding section 105 and discharged by way of a printing section 126. In this example, low cost popular plain paper is used for the recording paper 103 and the carriage 107 of the printing section 126 is equipped with printing heads 101S, 101Bk, 101C. 101M and 101Y and driven to reciprocate along a guide rail 109 by a motor (not shown). The printing head 101S ejects the treatment liquid as described above by referring to Example 1. The printing heads 101Bk, 101C, 101M and 101Y eject respectively a black ink, cyan ink, magenta ink and yellow ink onto the recording paper 103 in the above mentioned order.

The heads are fed with respective inks and the treatment liquid from respective ink tanks 108S, 108Bk, 108C, 108M and 108Y. At the time of ink election, a drive signal is fed to each of the electricity/heat converters, or the heaters, arranged at the ejection ports of the respective heads to apply thermal energy to the inks and the treatment liquid to produce bubbles therein, so that the ink and the treatment liquid are ejected by the pressure of the bubbles. Each of the heads is provided with 64 ejection ports that are arranged to a density of 360 dpi substantially in the direction of the conveyance of the recording paper 103, or the direction perpendicular to the scanning direction of each of the heads. An ink is ejected in an amount of 25 pl from each discharge port at a time.

With the above described arrangement, any adjacent heads are separated by ½ inches and hence the head 101S and the head 101Bk is separated from each other by ½ inches, while the printing density in the scanning direction is 720 dpi and the ejection frequency of each head is 7.2 KHz, so that black ink is ejected from the head 101Bk 0.05 sec. after the corresponding ejection of the treatment liquid from the head 101S.

Example 3

Figure 6:
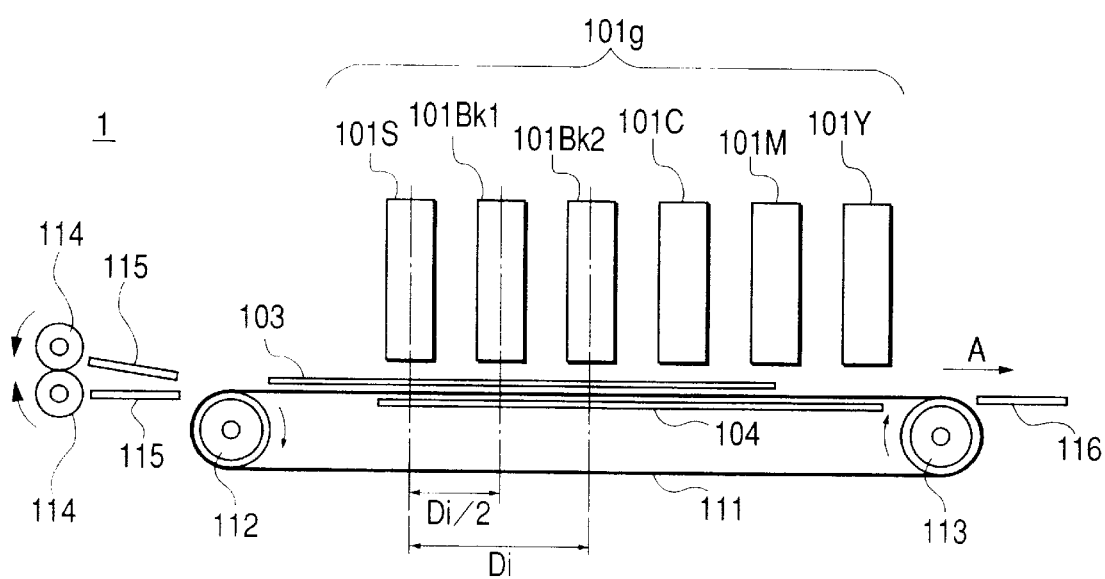
FIG. 6 is a schematic lateral view of still another printing apparatus with which an ink-jet printing method according to the invention can be carried out.

FIG. 6 is a schematic lateral view of the printing apparatus used in this example which ejects an ink containing the first pigment and an ink containing the second pigment separately unlike the apparatus of FIGS. 3 and 5 which ejects the mixed ink containing both the first pigment and the second pigment. Referring to FIG. 6. the group of printing heads 101g include a head 101S for ejecting the treatment liquid, a head 101Bk1 for ejecting the ink containing the first pigment, a head 101Bk2 for ejecting the ink containing the second pigment, a head 101C for ejecting a cyan ink, a head 101M for ejecting a magenta ink and a head 101Y for ejecting a yellow ink that are arranged in the direction A of the conveyance of the recording paper 103 as shown in FIG. 6. Black characters and/or color images are printed by ejecting the treatment liquid and the inks from the respective printing heads.

In this example, an ink with a low permeation speed (to be referred to as an overlay type ink hereinafter) was used for the black inks respectively containing the first pigment and the second pigment and ejected from the heads 101Bk1 and 101Bk2, and a treatment liquid and inks with a high permeation speed (to be referred to as a highly permeable ink hereinafter) were used respectively for the treatment liquid, the cyan ink, the magenta ink and the yellow ink ejected from the respective heads 101S, 101C, 101M and 101.

The treatment liquid and the inks used in this example had the respective compositions listed below.

Table 13 (treatment liquid)

Using the black ink containing the first pigment and the black ink containing the second pigment, after the application of the treatment liquid onto the recording paper, the first pigment, the second pigment and the polymeric dispersant each having the same polarity are mixed and react with each other.

In this example, the head 101S for the treatment liquid and the head 101Bk for the black ink containing the first pigment are separated by distance Di (see FIG. 6) that is equal to 40 mm and therefore the black ink Bk1 containing the first pigment is ejected from the corresponding Bk head 0.24 sec. after the corresponding ejection of the treatment liquid. Each printing head ejected the ink in an amount of 15 pl at a time except the Bk heads that ejected ink in an amount of about 10 pl at a time. Thus, about 20 pl of the black ink is ejected at a time from the Bk1 head and the Bk2 head to form a single pixel.

The printed object obtained by using the above apparatus and inks were evaluated as in Example 1-1 through 1-3 to find that they were substantially rated as the same as their counterparts of the preceding examples except that the OD value was slightly improved for each specimen.

Example 4

Figure 7:
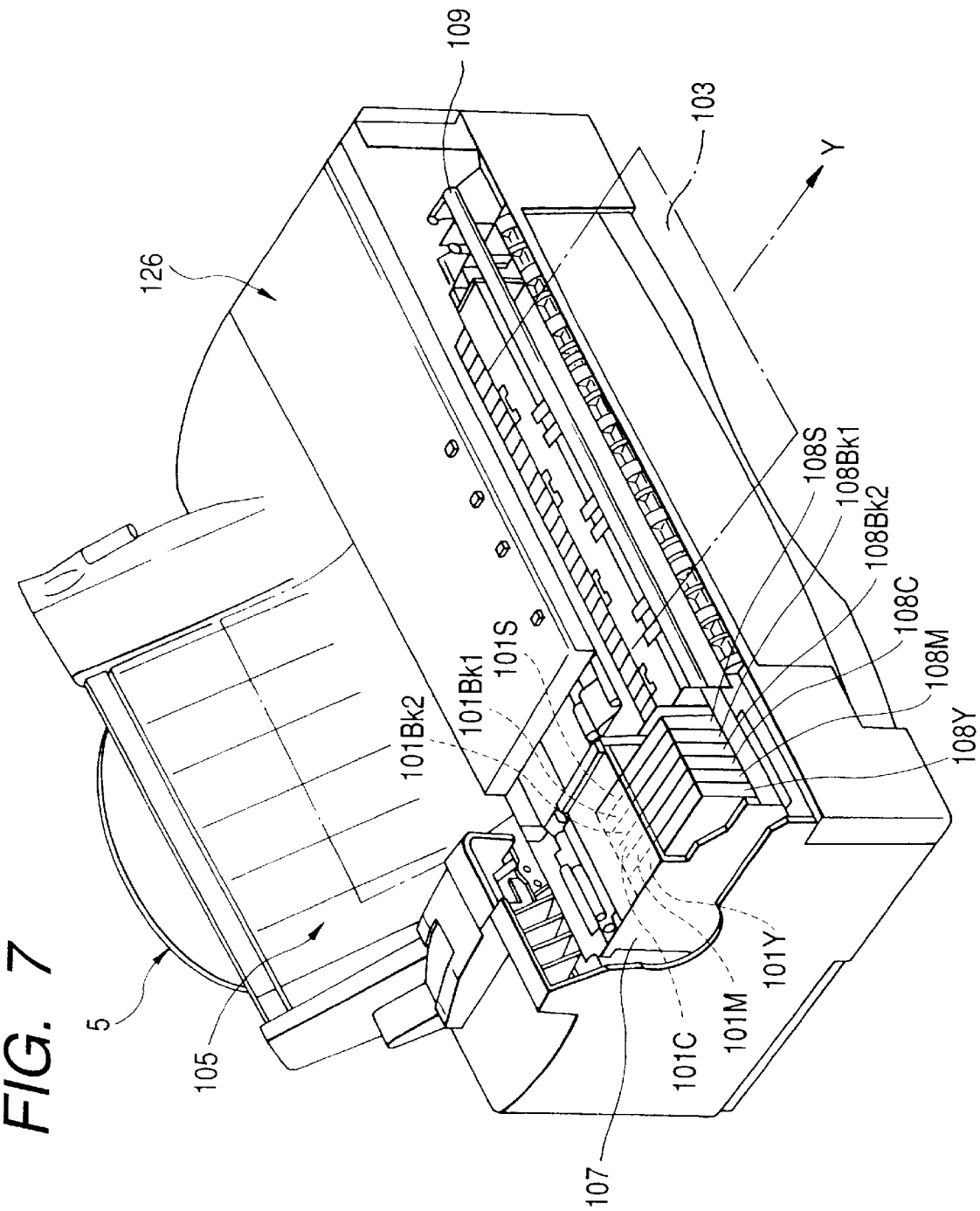
FIG. 7 is a schematic perspective view of still another printing apparatus with which an ink-jet printing method according to the invention can be carried out.

FIG. 7 is a schematic perspective view of the serial type printing apparatus 5 used in the process of this example, in which the ink containing the first pigment and the ink containing the second pigment were mixed in the areas of the recording medium where the treatment liquid had been applied. The method of the present invention can obviously be used not only for a full-line type printing apparatus but also for a serial type printing apparatus. The components in FIG. 7 that are similar to those of FIG. 6 are denoted respectively by the same reference symbols and will not be described any further.

Referring to FIG. 7, the recording paper 103, or the printing medium, is inserted from the paper feeding section 105 and discharged by way of the printing section 126. In this example, low cost popular plain paper is used for the recording paper 103 and the carriage 107 of the printing section 126 is equipped with printing heads 101S, 101Bk, 101C, 101M and 101Y and driven to reciprocate along the guide rail 109 by a motor (not shown). The printing head 101S ejects the treatment liquid. The printing head 101Bk1 ejects the ink containing the first pigment and the printing head 101Bk2 ejects the ink containing the second pigment. The printing heads 101C, 101M and 101Y eject respectively the cyan ink, magenta ink and yellow ink onto the recording paper 103 in the above mentioned order. The heads are fed with the respective inks and the treatment liquid from the respective ink tanks 108S, 108Bk1, 108Bk2, 108C, 108M and 10Y. At the time of ink ejection, a drive signal is fed to each of the electricity/heat converters, or the heaters, arranged at the ejection ports of the respective heads to apply thermal energy to the inks and the treatment liquid to produce bubbles therein, so that the ink and the treatment liquid are ejected by the pressure of the bubbles. Each of the heads is provided with 64 ejection ports that are arranged to density of 360 dpi substantially in the direction of the conveyance of the recording paper 103, or the direction perpendicular to the scanning direction of each of the heads. Each of the black inks is ejected in an amount of 15 pl from the corresponding ejection port at a time, whereas each of all the remaining inks is ejected in an amount of 23 pl from each the corresponding ejection port at a time.

With the above described arrangement, any adjacent heads are separated by ½ inches and hence the head 101S and the head 101Bk1 is separated from each other by ½ inches, while the printing density in the scanning direction is 720 dpi and the ejection frequency of each head is 7.2 KHz, so that the black ink is ejected from the head 101Bk1 0.05 sec. after the corresponding ejection of the treatment liquid from the head 101S.

Advantages of the Invention

As described above, according to the invention, it is possible to obtain an image having a high OD value and an excellent edge sharpness by using an ink containing a first pigment, a second pigment and a polymeric dispersant for the second pigment and a treatment liquid containing a polyvalent metal ion or a salt thereof capable of reacting with the ink. Additionally, the drawback of a slow fixing speed and insufficient fixation of the conventional pigment ink can be remedied to a large extent by using a method according to the invention. Additionally. the phenomenon of feathering can be minimized as a result of using an ink with a slow permeation speed. Furthermore, the problem of exudation and haze that can appear around each image dot can be effectively minimized by the method of the present invention.

A relatively good fixation effect can be obtained when the treatment liquid has a high permeability. The treatment liquid has a high permeability to significantly improve the permeation speed when a Ka value of not less than 5.0 $(ml \cdot m^{-2} \cdot msec^{-\frac{1}{2}})$ as expressed by the Bristow method is taken for the permeation speed of the treatment liquid.

By using a relatively highly permeable treatment liquid, the reaction product of the first ink and the second ink and the treatment liquid also has a high permeability to consequently increase the overall permeation speed. As a result, the fixing speed can also be increased to realize high speed printing.

TABLE 1

|  | Ka value (ml/m²/msec^(1/2)) | Acetylenol EH (%) | surface tension (mN/m) |
|---|---|---|---|
| Overlay type ink | Ka < 1 | 0 or more, but less than 0.2 (0 is inclusive, but 0.2 is not inclusive) | 40 or more (40 is inclusive) |
| Moderately permeable ink | 1 ≦ Ka < 5 | 0.2 or more, but less than 0.7 (0.2 is inclusive, but 0.7 is not inclusive) | 35 or more, but less than 40 (35 is inclusive, but 40 is not inclusive) |
| Highly permeable ink | Ka ≧ 5 | 0.7 or more (0.7 is inclusive) | less than 35 (35 is not inclusive) |

TABLE 2

(Treatment liquid)

| | |
|---|---|
| glycerol | 7 parts by weight |
| diethyleneglycol | 5 parts by weight |
| Acetylenol EH (available from Kawaken Fine Chemical) | 2 parts by weight |
| magnesium nitrate | 3 parts by weight |
| water | balance |

TABLE 3

(yellow (Y) ink)

| | |
|---|---|
| C.I Direct Yellow 86 | 3 parts by weight |
| grycerol | 5 parts by weight |
| diethyleneglycol | 5 parts by weight |
| Acetylenol EH (available from Kawaken Fine Chemical) | 1 parts by weight |
| water | balance |

TABLE 4

(magenta (M) ink)

| | |
|---|---|
| C.I Acid Red 289 | 3 parts by weight |
| grycerol | 5 parts by weight |
| diethyleneglycol | 5 parts by weight |
| Acetylenol EH (available from Kawaken Fine Chemical) | 1 parts by weight |
| water | balance |

TABLE 5

(cyan (C) ink)

| | |
|---|---|
| C.I Direct Blue 199 | 3 parts by weight |
| grycerol | 5 parts by weight |
| diethyleneglycol | 5 parts by weight |
| Acetylenol EH (available from Kawaken Fine Chemical) | 1 parts by weight |
| water | balance |

TABLE 6

(black (BK) ink)

| | |
|---|---|
| pigment dispersion solution 1 | 25 parts by weight |
| pigment dispersion solution 2 | 25 parts by weight |
| grycerol | 6 parts by weight |
| diethyleneglycol | 5 parts by weight |
| Acetylenol EH (available from Kawaken Fine Chemical) | 0.1 parts by weight |
| water | balance |

TABLE 7

(Treatment liquid)

| | |
|---|---|
| glycerol | 7 parts by weight |
| diethyleneglycol | 5 parts by weight |
| Acetylenol EH (available from Kawaken Fine Chemical) | 2 parts by weight |
| calcium nitrate | 2 parts by weight |
| water | balance |

TABLE 8

(black (BK) ink)

| | |
|---|---|
| pigment dispersion solution 1 | 45 parts by weight |
| pigment dispersion solution 2 | 5 parts by weight |
| grycerol | 6 parts by weight |
| diethyleneglycol | 5 parts by weight |
| Acetylenol EH (available from Kawaken Fine Chemical) | 0.1 parts by weight |
| water | balance |

What is claimed is:

1. An ink-jet printing method for use in a process of recording an image on a printing medium, comprising:
    a first step of applying an ink onto the printing medium by an ink-jet recording method; and
    a second step of applying a treatment liquid containing at least one of a polyvalent metal ion and a salt thereof;
    said first step being conducted subsequent to said second step so as to cause the ink and the treatment liquid to come into contact with each other in a liquid state on the printing medium;
    said ink containing a first pigment, a second pigment and a polymeric dispersant for dispersing said second pigment in an aqueous medium, said first pigment and said second pigment being contained in said ink in a dispersed state;
    said first pigment being a self-dispersing pigment having an anionic group bound to the surface of thereof directly or by way of another atomic group, said second pigment being capable of dispersing in said aqueous medium by means of said polymeric dispersant;
    said polymeric dispersant containing at least one of an anionic polymeric dispersant and a nonionic polymeric dispersant;
    said treatment liquid destabilizing dispersion stability of at least one of said pigments contained in said ink when the treatment liquid and the ink are applied onto the printing medium so as to come into contact with each other in a liquid state.

2. The ink-jet printing method according to claim 1, wherein said polyvalent metal ion is at least one polyvalent metal cation selected from the group of consisting $Ca^{++}$, $Cu^{++}$, $Ni^{++}$, $Mg^{++}$, $Zn^{+++}$, $Ba^{++}$, $Al^{+++}$, $Fe^{+++}$, $Cr^{+++}$, $Co^{++}$, $Fe^{++}$, $La^{++}$, $Nd^{+++}$ and $Y^{+++}$.

3. The ink-jet printing method according to claim 1 or 2, wherein said salt is formed from at least one anion selected from the group consisting of Cl-, $NO_3^-$, $I^-$, $Br^-$, $ClO_3^-$ and $CH_3COO^-$ and said polyvalent metal cation.

4. The ink-jet printing method according to claim 1, wherein the concentration of said salt is in the range of 0.01 to 10% by weight based on the total weight of said treatment liquid.

5. The ink-jet printing method according to claim 4, wherein the concentration of said salt is in the range of 1 to 5% by weight based on the total weight of said treatment liquid.

6. The ink-jet printing method according to claim 5, wherein the concentration of said salt is in the range of 1 to 3% by weight based on the total weight of said treatment liquid.

7. The ink-jet printing method according to claim 1, wherein the permeation speed of said treatment liquid as expressed in Ka value using the Bristow method is not less than 5.0 ($ml \cdot m^{-2} \cdot msec^{-\frac{1}{2}}$).

8. The ink-jet printing method according to claim 1, wherein the permeation speed of said ink as expressed in Ka value using the Bristow method is less than 1 ($ml \cdot m^{-2} \cdot msec^{-\frac{1}{2}}$).

9. The ink-jet printing method according to claim 1, wherein said anionic group is at least one anionic group selected from the group consisting of the following: —COOM, —$SO_3M$, —$PO_3HM$ and —$PO_3M_2$ (where M independently represents a hydrogen atom, an alkali metal, ammonium or an organic ammonium).

10. The ink-jet printing method according to claim 1, wherein said atomic group is selected from the group consisting of an alkylene group having 1 to 12 carbon atoms, a substituted or unsubstituted phenylene group and a substituted or unsubstituted naphthylene group.

11. The ink-jet printing method according to claim 1, wherein 80% or more of the particles of said first pigment has a particle diameter of 0.05 to 0.3 $\mu$m.

12. The ink-jet printing method according to claim 11, wherein 80% or more of the particles of said first pigment has a particle diameter of 0.1 to 0.25 $\mu$m.

13. The ink-jet printing method according to claim 1, wherein said second pigment is dispersed by absorbing said polymeric dispersant to the surface thereof.

14. The ink-jet printing method according to claim 1, wherein said polymeric dispersant is at least one polymeric dispersant of a sulfonic acid type polymeric dispersant or a carbonic acid type polymeric dispersant.

15. The ink-jet printing method according to claim 1, wherein said second pigment contains at least two pigments having different structures.

16. The ink-jet printing method according to claim 1, wherein the total amount of said first and second pigments contained in said ink is in the range of 0.1 to 15% by weight based on the total weight of said ink.

17. The ink-jet printing method according to claim 16, wherein the total amount of said first and second pigments contained in said ink is in the range of 1 to 10% by weight based on the total weight of said ink.

18. The ink-jet printing method according to claim 1, wherein the weight ratio of said first pigment to said second pigment is in the range of 5/95 to 97/3.

19. The ink-jet printing method according to claim 18, wherein the weight ratio of said first pigment to said second pigment is in the range of 10/90 to 95/5.

20. The ink-jet printing method according to claim 19, wherein the weight ratio of said first pigment to said second pigment is in the range of 9/1 to 4/6.

21. The ink-jet printing method according to claim 1, wherein said first pigment is contained more than said second pigment.

22. The ink-jet printing method according to claims 1, wherein at least one of said first pigment and said second pigment is carbon black.

23. The ink-jet printing method according to claim 1, wherein said ink further contains a dye.

24. The ink-jet printing method according to claim 23, wherein said dye is an anionic dye.

25. The ink-jet printing method according to claim 24, wherein said anionic dye is at least one dye selected from the group consisting of an acidic dye. a direct dye and a reactive dye.

26. The ink-jet printing method according to claim 24, wherein said anionic dye has a chemical structure having a disazo or trisazo skeleton.

27. An ink-jet printing method comprising a step of applying a first ink, a second ink and a treatment liquid so as to come into contact with each other in a liquid state on the surface of a printing medium;

said first ink containing as a first pigment a self-dispersing pigment having an anionic group bound to the surface thereof directly or by way of another atomic group, said second ink containing a second pigment and a polymeric dispersant for dispersing said second pigment in an aqueous medium, said second pigment being capable of dispersing in said aqueous medium by means of said polymeric dispersant, said polymeric dispersant containing at least one of an anionic polymeric dispersant and a nonionic polymeric dispersant;

said treatment liquid containing at least one of a polyvalent metal ion and a salt thereof, and destabilizing dispersion stability of at least one of said pigments contained in said inks when the treatment liquid and either of the inks are applied onto the printing medium so as to come into contact with each other in a liquid state, said treatment liquid being applied onto said printing medium prior to the application of said first ink and said second ink.

* * * * *

UNITED STATES PATENT AND TRADEMARK OFFICE
CERTIFICATE OF CORRECTION

PATENT NO. : 6,494,569 B2
DATED : December 17, 2002
INVENTOR(S) : Koitabashi et al.

It is certified that error appears in the above-identified patent and that said Letters Patent is hereby corrected as shown below:

Column 1,
Line 15, "It is" should read -- it is --;
Line 40, "depends" should read -- depending --; and
Line 53, "surf ace" should read -- surface --.

Column 2,
Line 40, "In" should read -- in --.

Column 3,
Line 16, "haze" should read -- haze. --.

Column 5,
Line 57, "Is" should read -- is --.

Column 6,
Line 8, "foamed" should read -- formed --.

Column 8,
Line 13, "In" should read -- in --; and
Line 21, "particles." should read -- particles, --.

Column 10,
Line 7, "dirnethylformamide" should read -- dimethylformamide --; and
Line 13, "polypropyleneglycol:" should read -- polypropyleneglycol; --.

Column 12,
Line 47, "23:" should read -- 23; --; and
Line 54, "below:" should read -- below; --.

Column 13,
Line 52, "then" should read -- than --.

Column 14,
Line 37, "Is" should read -- is --.

Column 16,
Line 48, "Is" should read -- is --.

Column 17,
Line 5, "Information" should read -- information --.

UNITED STATES PATENT AND TRADEMARK OFFICE
CERTIFICATE OF CORRECTION

PATENT NO.   : 6,494,569 B2
DATED        : December 17, 2002
INVENTOR(S)  : Koitabashi et al.

It is certified that error appears in the above-identified patent and that said Letters Patent is hereby corrected as shown below:

Column 20,
Line 39, "101C." should read -- 101C, --.

Column 22,
Line 15, "10Y." should read -- 108Y. --.

Column 23,
Tables 3, 4 and 5, "grycerol" should read -- glycerol -- and "1 parts" should read -- 1 part --.

Column 24,
Tables 6 and 8, "grycerol" should read -- glycerol --;
Line 32, insert the following Tables 9 through 15:
--              Table 9 (Treatment liquid)

| glycerol | 7 parts by weight |
|---|---|
| diethyleneglycol | 5 parts by weight |
| Acetylenol EH (available from Kawaken Fine Chemical) | 2 parts by weight |
| calcium nitrate | 2 parts by weight |
| water | balance |

Table 10 (black (BK) ink)

| pigment dispersion solution 1 | 45 parts by weight |
|---|---|
| pigment dispersion solution 2 | 2.5 parts by weight |
| C.I. Food Black 2 | 0.25 parts by weight |
| glycerol | 6 parts by weight |
| diethyleneglycol | 5 parts by weight |
| Acetylenol EH (available from Kawaken Fine Chemical) | 0.1 parts by weight |
| water | balance |

UNITED STATES PATENT AND TRADEMARK OFFICE
CERTIFICATE OF CORRECTION

PATENT NO. : 6,494,569 B2
DATED : December 17, 2002
INVENTOR(S) : Koitabashi et al.

It is certified that error appears in the above-identified patent and that said Letters Patent is hereby corrected as shown below:

Column 24 (cont'd),

Table 11 (black (BK) ink)

| | |
|---|---|
| pigment dispersion solution 2 | 50 parts by weight |
| ethyleneglycol | 8 parts by weight |
| glycerol | 5 parts by weight |
| Acetylenol EH (available from Kawaken Fine Chemical) | 4 parts by weight |
| water | balance |

Table 12

| | Example 1-1 | Example 1-2 | Example 1-3 | Comparative Example 1 | Comparative Example 2 |
|---|---|---|---|---|---|
| OD | 1.42 | 1.40 | 1.42 | 1.00 | 1.35 |
| time necessary for obtaining water-resistance | several seconds | within several seconds | within several seconds | about 1 hour | about 1 hour |
| fixation | 0.5 sec. | less than 0.5 sec. | less than 0.5 sec. | 15 sec. | 40 sec. |
| appearance of feathering (haze) | A | A | A | A | A |

Table 13 (Treatment liquid)

| | |
|---|---|
| glycerol | 7 parts by weight |
| diethyleneglycol | 5 parts by weight |
| Acetylenol EH (available from Kawaken Fine Chemical) | 2 parts by weight |
| calcium nitrate | 2 parts by weight |
| water | balance |

UNITED STATES PATENT AND TRADEMARK OFFICE
CERTIFICATE OF CORRECTION

PATENT NO. : 6,494,569 B2
DATED : December 17, 2002
INVENTOR(S) : Koitabashi et al.

It is certified that error appears in the above-identified patent and that said Letters Patent is hereby corrected as shown below:

Column 24 (cont'd),
  Table 14 (black ink containing the first pigment (Bk1))

| pigment dispersion solution 1 | 50 parts by weight |
|---|---|
| glycerol | 6 parts by weight |
| diethyleneglycol | 5 parts by weight |
| Acetylenol EH (available from Kawaken Fine Chemical) | 0.1 parts by weight |
| water | balance |

Table 15 (black ink containing the second pigment (Bk2))

| pigment dispersion solution 2 | 50 parts by weight |
|---|---|
| ethyleneglycol | 8 parts by weight |
| glycerol | 5 parts by weight |
| isopropyl alcohol | 4 parts by weight |
| water | balance |

--;

Line 50, "of" should be deleted; and
Line 65, "of consisting" should read -- consisting of --.

Column 25,
Line 3, "Cl-," should read -- $Cl^-$, --; and
Lines 38 and 41, "has" should read -- have --.

UNITED STATES PATENT AND TRADEMARK OFFICE
CERTIFICATE OF CORRECTION

PATENT NO. : 6,494,569 B2
DATED : December 17, 2002
INVENTOR(S) : Koitabashi et al.

It is certified that error appears in the above-identified patent and that said Letters Patent is hereby corrected as shown below:

<u>Column 26,</u>
Line 17, "claims 1," should read -- claim 1, --;
Line 26, "acidic dye." should read -- acidic dye, --; and
Line 37, "group," should read -- group; --.

Signed and Sealed this

Eighteenth Day of November, 2003

JAMES E. ROGAN
*Director of the United States Patent and Trademark Office*